J. A. CARTER.
VEHICLE WHEEL.
APPLICATION FILED NOV. 15, 1919.

1,379,441.

Patented May 24, 1921.

Inventor
James A. Carter
By Ralph Tanish Atty

UNITED STATES PATENT OFFICE.

JAMES A. CARTER, OF ST. LOUIS, MISSOURI.

VEHICLE-WHEEL.

1,379,441.  Specification of Letters Patent.  Patented May 24, 1921.

Application filed November 15, 1919. Serial No. 338,175.

*To all whom it may concern:*

Be it known that I, JAMES A. CARTER, a citizen of the United States, residing at the city of St. Louis, State of Missouri, have invented a certain new and useful Improvement in Vehicle-Wheels, of which the following is a specification, reference being had to the accompanying drawing, forming a part thereof.

This invention relates to a certain new and useful improvement in vehicle wheels, the chief object of my present invention being to provide a vehicle wheel capable of resiliently, without the use or employment of pneumatic tubes or tires, sustaining the load in an efficient manner, the wheel comprising a tread divided into separate slightly spaced sections each hingedly supported at two points by spokes, in turn, yieldingly supported at the hub of the wheel.

With the above and other objects in view, my present invention resides in the novel features of form, construction, arrangement, and combination of parts hereinafter described and afterward pointed out in the claims.

In the accompanying drawing, I have illustrated the preferred form of my invention, in which—

Figure 1:
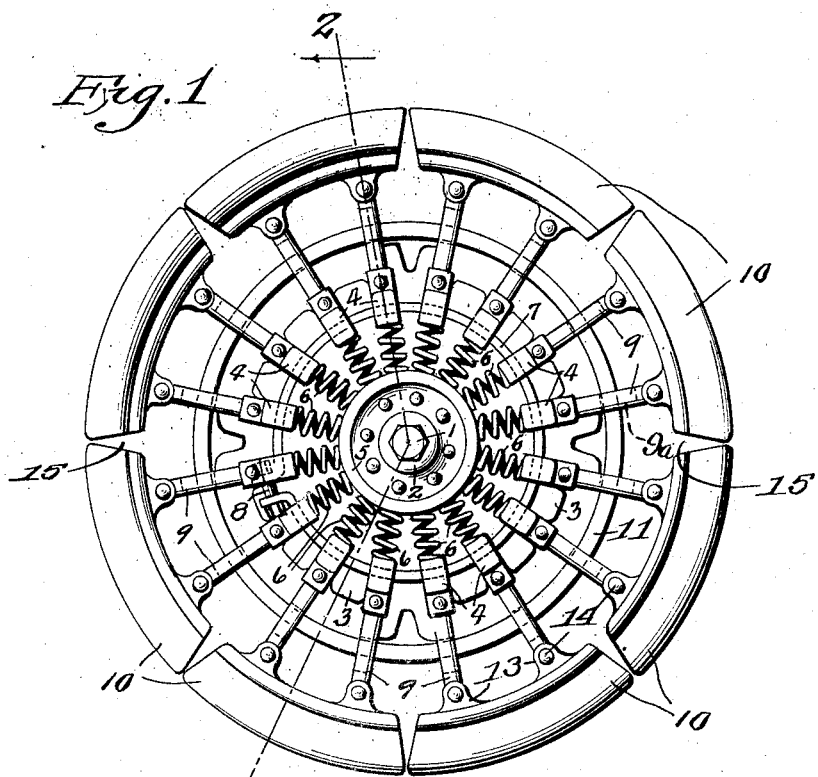
Figure 1 is a side elevational view of the wheel.

Referring now more in detail to the said drawing, in which like reference characters refer to like parts throughout the several views, 1 indicates a fragment of the axle or skein of the vehicle, upon which is mounted the hub 2 of the wheel, hub 2 having an outwardly disposed web-portion 3, preferably centrally located, provided in its periphery with radial grooves in which are slidingly mounted saddle-members 4.

5—5 indicate flanged barrel members or cylinders which are disposed upon opposite sides of, and suitably fixed to, the web 3, the inwardly extending barrel or cylinder 5 providing means for the employment with the wheel of a band-brake.

Figure 2:
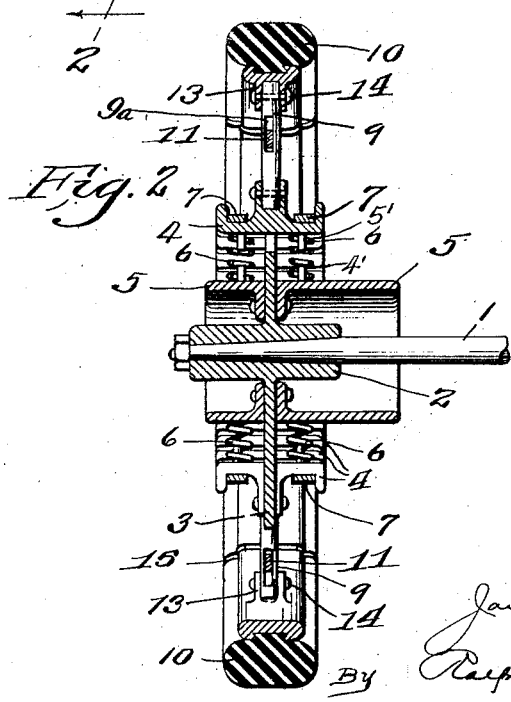
Fig. 2 is a vertical sectional view through the same on approximately the line 2—2, Fig. 1.

Interposed between the saddles 4 and barrels 5, are suitable preferably coiled springs 6 arranged in annular series on each side of the web 3, there being a pair of the springs 6 for each saddle 4. As seen especially in Fig. 2, the springs 6 are held from displacement by oppositely disposed pins or studs 4' and 5' projecting thereinto from the saddles 4 and barrels 5, respectively.

Each saddle 4 is provided with a seat or groove at each side of the web 3, in which seats or grooves are mounted bands 7 embracing all of the saddle members 4, holding them from displacement and restraining them from excessive outward movement relatively to the hub of the wheel. The bands 7 have bent ends for the passage of connecting-bolts 8, by which the bands may be adjustably tightened and the springs 6 placed under slight compression in the assembling of the wheel.

Each saddle member 4 supports or carries a spoke or radial extension 9 fixed to or integral therewith. The tread of the wheel is divided into a plurality of separate slightly spaced preferably cushion sections 10, each section being preferably hingedly connected to the outer ends of two of the spokes 9. For the purpose of such connection, each section 10 is provided with pairs of spaced ears 13, to and between which the outer ends of the spokes 9 are connected by pins or the like 14. By the construction described, the tread sections may, under load or in use, be rocked or moved inwardly at either end compressing their respective supporting springs 6, the saddles 4 being freely slidable at all times in the grooves of the hub-web 3. When the tread-sections are relieved of their load, the springs 6 act, as will be evident, to restore them to normal position. To freely permit the independent rocking or swinging movement without binding or interference of the several tread-sections 10, each section 10 is suitably obliquely cut away inwardly at its opposite ends, as at 15—15.

The saddles 4 being disposed for yielding movement in grooves of the hub-web 3, the web 3 has at all times a sliding driving connection with the spokes and their carried tread-sections, such connection being increased preferably at points arranged equidistantly around the wheel by outwardly or radially disposed extensions 3', seen especially in Fig. 1.

To additionally maintain the several spokes 9 and their carried tread-sections 10 annularly in alinement and to also prevent a too great or excessive lateral movement of the several sections, as in rounding corners and the like, I provide a spoke-connecting member in the form of a flat annular band 11, which is loosely threaded through the several spokes in slots 9ª provided longitudinally in the several spokes. The slots 9ª having a length greater than the width of the band 11 and having a length approximately equal to the compression-distance of the several springs 6, it will be evident that the band 11 is capable of performing its functions without in any way interfering with the yielding or resilient radial movement of the several spokes and their supported tread-sections 10.

I am aware that changes in the form, construction, arrangement and combination of the several parts of the wheel may be made and substituted for those herein shown and described without departing from the nature and principle of my invention.

Having thus described my invention, what I claim and desire to secure by Letters Patent is:

1. A wheel comprising a hub, an annular web upon the hub, an annular series of springs carried by the hub on each side of the web, and an annular series of tread-members carried for yielding movement by the springs, the web having a sliding driving connection with the tread members.

2. A wheel comprising a hub, an annular web upon the hub, an annular series of springs carried by the hub on each side of the web, saddles seated upon the springs for yielding movement relatively to the hub, and an annular series of tread members supported by the saddles, the web having a sliding driving connection with the saddles.

3. A wheel comprising a hub, a radially grooved web upon the hub, an annular series of springs carried by the hub on each side of the web, saddles seated upon the springs and disposed for yielding movement in the grooves of the web, an annular series of tread-members supported by the saddles, and bands embracing all the saddles for preventing displacement thereof relatively to the web and springs.

4. A wheel comprising a hub, a radially grooved annular web upon the hub, an annular series of springs carried by the hub on each side of the web, saddles seated upon the springs and disposed for yielding movement in the grooves of the web, radial spokes fixed to the saddles, an annular series of tread-members carried by the spokes, bands embracing all the saddles for preventing displacement of the saddles relatively to the web and springs, and an annular band engaging all the spokes for retarding lateral movement thereof and their carried tread-members relatively to the hub.

5. A wheel comprising a hub, an annular web on the hub, an annular series of springs carried by the hub on each side of the web, saddles supported for yielding movement on the springs, tread-supporting spokes carried by the saddles, and bands engaging all the saddles for preventing displacement thereof relatively to the hub and springs, the web having a sliding driving connection with all the saddles.

In testimony whereof, I have signed my name to this specification.

JAMES A. CARTER.